United States Patent [19]

King et al.

[11] Patent Number: 4,624,539
[45] Date of Patent: Nov. 25, 1986

[54] PORTABLE MIRROR DEVICE FOR REAR VIEW OBSERVATION IN A MOTOR VEHICLE

[76] Inventors: Peter C. King, 2424 Franklin, Columbus, Ind. 47201; James C. Arthur, 4030 N. Riverside Dr., Columbus, Ind. 47203

[21] Appl. No.: 723,816

[22] Filed: Apr. 16, 1985

[51] Int. Cl.⁴ .................................................. G02B 7/18
[52] U.S. Cl. ...................................... 350/632; 248/467; 248/484
[58] Field of Search ................ 350/632, 635, 636, 638; 248/467, 479, 481, 482, 484

[56] References Cited

U.S. PATENT DOCUMENTS

| | | | |
|---|---|---|---|
| D. 239,932 | 5/1976 | Kim . | |
| 1,861,148 | 5/1932 | Withrow | 248/481 |
| 1,992,233 | 2/1935 | Norwood | 248/484 |
| 2,668,447 | 10/1951 | Shaikun . | |
| 2,856,814 | 11/1956 | Dillmann | 248/467 |
| 2,880,651 | 8/1956 | Fenyo . | |
| 2,968,995 | 3/1957 | Holden . | |
| 3,168,276 | 2/1965 | Schneider | 248/467 |
| 3,239,179 | 4/1962 | Margulis | 248/205 |

FOREIGN PATENT DOCUMENTS 342083 3/1904 France ................... 248/481

Primary Examiner—Jon W. Henry
Attorney, Agent, or Firm—Sixbey, Friedman & Leedom

[57] ABSTRACT

A portable mirror device for rear view observation in a motor vehicle or the like has a mirror device connected to an end of an adjustment arm by a ball-and-socket type joint, while an opposite end of the adjustment arm is swivally connected to a mounting arrangement comprised of a spring clip, having a pair of clip members connected by a spring member, the spring member biasing the clip members towards a position wherein holding ends of the clip members engage each other. A suction cup device that is fastened to a second end of one of the clip members. The provision of two different types of mounting mechanisms and pivot arrangements at opposite ends of the adjustment arm produce a very versatile portable mirror device that can be mounted to any of a large number of different elements and utilized in a large number of different orientations. The device is also constructed so as to minimize problems resulting from vehicle vibrations, road shocks and the like.

8 Claims, 3 Drawing Figures

FIG. 1.
FIG. 2.
(PRIOR ART)
FIG. 3.
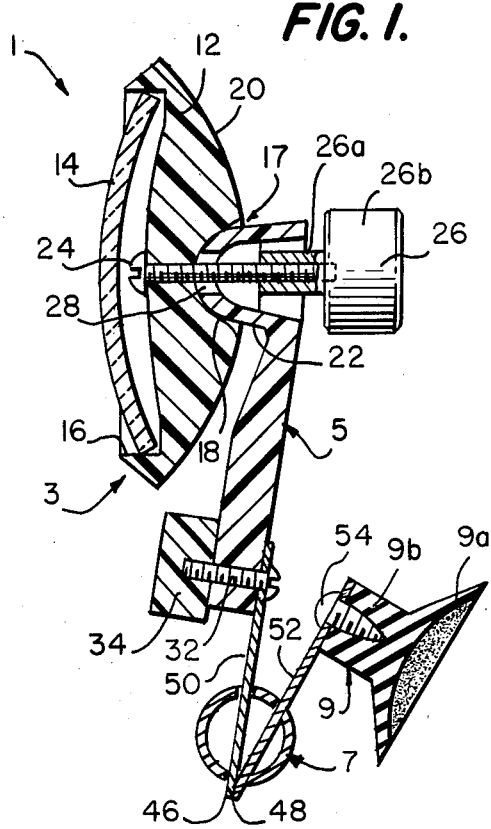
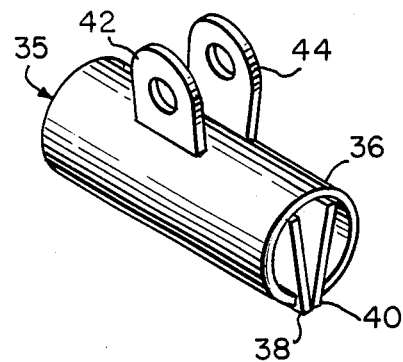
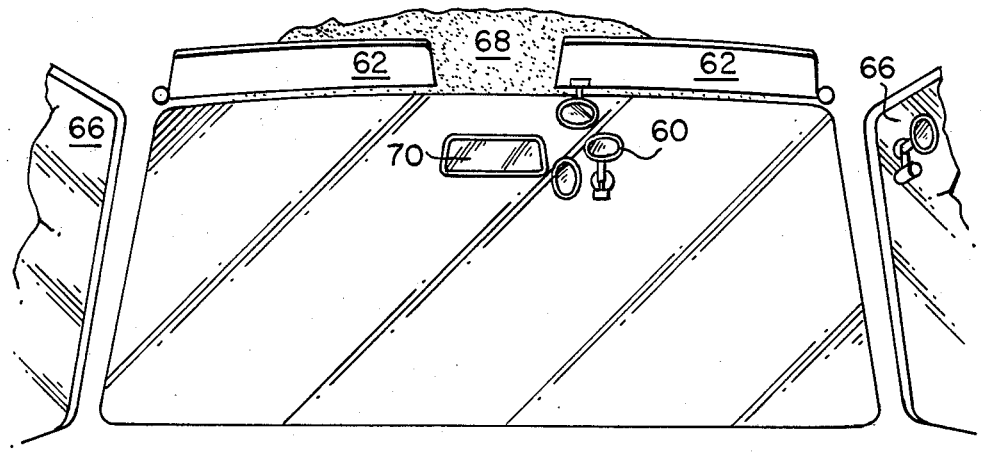

PORTABLE MIRROR DEVICE FOR REAR VIEW OBSERVATION IN A MOTOR VEHICLE

DESCRIPTION

1. Technical Field

The present invention is directed to adjustable mirror devices and more particularly to such mirror devices that are provided with different means for mounting at various locations in a motor vehicle or the like. For example, mirrors that are mountable as auxiliary rear view mirrors or vanity mirrors.

2. Background Art

A mirror and an adjustable support therefor is known from U.S. Pat. No. 2,880,651 to P. J. Fenyo wherein a U-shaped clamping element has a suction cup affixed to one leg thereof and a telescoping rod support connected to the other leg of the U-shaped clamping element by a first ball-socket joint. A second ball and socket joint pivotally joins the other end of the rod to a mirror. With this arrangement, the mirror can be supported by attachment of the clip to a sunvisor or top edge of a window of an automobile, or it may be attached to a window or other flat surface, such as the dashboard of an automobile, by way of the suction cup.

However, the use of a U-shaped clip as a mounting means limits the effective utilization of the mirror since a U-shape that is sufficient for securement over the edge of very thin structures will not suitably fit over relatively thick ones, while one having sufficient spacing between it legs for gripping a thick element, such as a padded visor, will be too loose to be securely held over the relatively thin edge of a window. Furthermore, unless the U-shaped clip is relatively inflexible (which would further limit its ability to grip edges of various different thicknesses), the mirror will have a tendency to wobble due to vehicle vibrations and the like, when the suction cup is utilized as the mounting means. In addition, there will be situations where the frictional interfit of the ball and socket joint will be insufficient to secure the mirror in a desired orientation when subjected to jarring and vibration as will occur during normal driving of an automobile.

U.S. Pat. Nos. 2,968,995 to O. W. Holden and 2,856,814 to E. F. Dillmann show other portable mirror arrangements. In the portable mirror of the Holden patent, a suction cup is provided for mounting of the mirror and the mirror is connected to the suction cup by way of a ball and socket joint. In the Dillmann patent, a rear view mirror is pivotally mounted to a housing by a ball and socket joint and the housing is designed to be secured to a vehicle window by way of the use of both suction cups and a U-shaped window edge clip. While mirrors of the type shown in these patents may be somewhat more stable than those of the above-noted patent to Fenyo, these mirror arrangements do not possess the ability to be mounted to as many different types of surfaces or in as many different types of orientations as the Fenyo mirror.

DISCLOSURE OF THE INVENTION

In view of the foregoing, it is an object of the present invention to provide a portable mirror device for rear view observation in a motor vehicle or the like that is adaptable to mounting on a maximum number of different vehicle locations, yet will be stable in any manner mounted.

It is a further object of the present invention to provide a mirror device of the aforementioned type wherein a suction cup means is provided for mounting on a flat, firm surface, such as a window, while a spring clip is provided that is large enough to grip all vehicle visors in production, has a spring that is strong enough to provide sufficient gripping force and clip legs that are long enough to enable installation without undue effort.

It is yet another object of the present invention to provide pivotal adjustments, both in the vicinity of the mirror and the clip mounting means that can be easily adjusted to adapt the mirror to a required orientation irrespective of the angle or orientation of the mounting surface.

In accordance with a preferred embodiment of the present invention, these and other objects are achieved through the provision of a portable mirror device that has a spring clip having a pair of clip members that are connected by a spring member so that the clip members are biased towards a position wherein first, holding ends of the clip members engage each other. A suction cup means is fastened to a second end of one of the clip members, while an adjustment arm is swivally connected at one of its ends to a second end of the other of the clip members with a mirror means being connected to an opposite end of the adjustment arm. Adjustment knobs are associated with both the swivel connection between the adjustment arm and the clip member and with the ball-and-socket joint used for connecting the mirror to the opposite end of the adjustment arm. These adjustment knobs can be utilized from releasing and securing the connections for enabling the mirror orientation to be adjusted or secured in place.

These and other features of the present invention will be come more apparent from the following detailed description when taken in conjunction with the drawings.

BRIEF DESCRIPTION OF THE DRAWINGS

FIG. 1 is a cross-sectional view taken along a vertical center plane of a preferred embodiment of the present invention;

FIG. 2 is an illustration of a spring clip of a type utilized by itself in the prior art; and FIG. 3 is a schematic view of the interior of a vehicle illustrating various mounting locations and orientations for the mirror device in accordance with the present invention.

BEST MODE FOR CARRYING OUT THE INVENTION

With reference to the drawings, a preferred embodiment of the present invention will now be described.

In FIG. 1, the portable mirror device for rear view observation in a motor vehicle in accordance with the present invention is designated generally by the reference numeral 1. The mirror device has four major components, namely, mirror means 3, adjustment arm 5, spring clip 7, and suction cup means 9.

The mirror means 3 comprises a mirror lens housing 12 that receives a mirror lens 14 within a frontal recess 16 thereof. As shown, the lens 14 is convexly bowed in order to function as a wide-angle mirror. However, instead of being convexly bowed, the mirror lens may be flat or concaved to obtain different reflective characteristics. Likewise, the perimetric configuration of the mirror lens 14 may be oval, square, rectangular or any other configuration desired whether or not mirror lens 14 is convexly bowed as shown; but, regardless of the perimetric shape, the lens mounting recess 16 should conform to that shape in order that the mirror lens 14 can be snugly received within this recess 16.

Mirror means 3 is connected to the adjustment arm 5 by way of a ball-and-socket type joint designated generally as 17. The ball-and-socket type joint 17, in the illustrated embodiment, has a socket recess 18 formed on the rear side 20 of the lens housing 12 and a ball member 22 formed by a dome-shaped configuration at the end of arm 5 shown as the top end in FIG. 1. In order to secure joint 17 together, a releaseable locking means is provided comprised of a threaded fastening means 24 that projects rearwardly from the mirror means 3 at the center of the socket recess 18, and an adjustment knob 26 into which the fastening means 24 is threaded. When a convexly bowed mirror lens 14 is utilized, it is merely sufficient to provide a bore through the lens housing 12 at the noted location and to insert a screw through the bore, the lens 14, after mounting, serving to prevent the threaded fastener 24 from falling out of the bore. However, if a flat or concave lens is to be used, a counterbore for the screw would be required, or where the lens housing 12 is formed of plastic, the threaded fastener 24 may simply be unitarily molded so as to project from the center of the socket.

The threaded fastener 24 passes through an aperture 28 in the apex of the dome-shaped ball formation 22 and is threaded into a threaded aperture in a reduced diameter portion 26a of the adjustment knob 26. By significantly oversizing the diameter of opening 28 relative to the diameter of fastener 24 and by virtue of the hollow interior of the ball formation 22, the mirror means can be rocked upon the adjustment arm to achieve the desired angling therebetween. When the desired angle is achieved, the adjustment knob can be tightened so as to secure that orientation by immobilizing the ball-and-socket type joint by increasing the pressure exerted by the mirror on the adjustment arm, knob portion 26b being brought into engagement with at least a portion of the periphery of the open end of the ball formation 22. Should the mirror require readjustment, the knob 26 can be loosened, the angling between the mirror means 3 and the adjustment arm 5 changed, and then the knob 26 retightened.

For mounting of the portable mirror device 1 on structures having a grippable edge, the spring clip 7 is provided. The spring clip 7 is of a type known, per se, and illustrated by itself in FIG. 2. Such a known spring clip 35 has a cylindric spring member 36 and a pair of clip members 38, 40. The clip members 38, 40 are received between the opposite, longitudinally extending, edges of the cylindrically shaped spring 36 and have apertured ends 42, 44 which extend upwardly through slots in the cylindrical spring 36. With such a spring clip 35, the spring acts to bias the clip members toward a position wherein first, holding ends of the clip members engage each other, but can be spread apart by pressing of the opposite apertured ends 42, 44 together.

Spring clip 7 of the present invention differs from such a known spring clip 35 only in the following respects. Firstly, such spring clips 35 are relatively small and the holding ends of the clamp elements 38, 34 would not be able to be sufficiently spread apart in order to grip relatively thick sunvisors; thus, the spring element of the spring clip 7 of the present invention is enlarged relative to that of conventional spring clips 35 in order to enable a relatively large space to be obtained between holding ends 46, 48 of spring clip 7. Furthermore, since a spring which would exert sufficient clamping force for securing the clip over the edge of the relatively thin member, such as a window, would exert such a high force as to render it difficult to maximally spread apart the holding ends 46,48 for gripping a relativey thick part, such as a sunvisor, the apertured ends 50, 52 of the spring clip 7 have been elongated in comparison to the relatively short, tab-like ends 42, 44 of known clip 35, in order to provide sufficient leverage to enable the use of a spring element which exerts a relatively high biasing force upon the clamping elements, without requiring undue effort to them apart.

For mounting of the mirror device 1 on flat surfaces, such as a window surface, suction cup 9 is provided and may be of any known suction cup construction. As illustrated, a one-piece elastomeric suction cup member is utilized as suction means 9, this member having a cup portion 9a and a cylindric attachment portion 9b. A screw 54 is passed through an aperture in leg 52 of one of the clamping elements and is threaded into the attachment portion 9b of suction cup means 9 in order to secure the clip 7 and the suction means 9 together. The spring clip 7 with the suction means 9 attached thereto is joined to the end of adjustment arm 5 opposite the ball formation 22 by a screw 32. Screw 32 passes through an aperture in the leg 50 of the other clamping element, passes through an aperture in the adjustment arm 5 and is threaded into an aperture of a second adjustment knob 34. With the second adjustment knob 34 loosely threaded onto the screw 32, the adjustment arm 5 may be swivelled about screw 32 so as to vary the angle between the adjustment arm 5 and the holding ends 46, 48 of the spring clip 7. Once the desired angular relationship is achieved, the swivel pivot is immobilized by tightly threading the second adjustment knob 34 onto the screw 32 so as to result in the end of the adjustment arm being tightly clipped between the knob 34 and the end of the clamping element leg 50.

With reference to FIG. 3, some of the various manners in which the portable mirror device in accordance with the present invention may be utilized can be seen. FIG. 3 illustrates the interior of a vehicle having a front windshield 60, a pair of sunvisors 62, a dashboard 64, side windows 66, and a headliner 68, as well a conventional, standard equipment, rear view mirror 70. Via the spring clip 7, the portable mirror device 1 may be attached to an edge of one of the sun visors 62 (position A) or may be attached to an edge of the rear view mirror 70 (position B) so as to serve as a secondary, wide-angle, rear view mirror. Alternatively, via the suction cup means 9, the mirror device 1 can be mounted directly to the windshield (position C) at any desired location or it can be mounted directly to any of the side windows 66 (position D). Other manners of use, both in and out of the vehicle environment, will also be readily apparent.

From the foregoing, it should be recognized that due to the provision of the two different types of mounting mechanisms and the pivot arrangements at the oppostie ends of the adjustment arms a very versatile portable mirror device is achieved that can be mounted to any of a large number of different elements and utilized in a large number of different orientations. On the other hand, due to the fact that the pivots can be immobilized, no problems will exist with regard to the mirror changing its orientation due to vibrations, road shocks, or the like. Furthermore, since the clamping elements of the spring clip 7 are biased into a position wherein the holding ends engage each other when the clip is not used for mounting, and because of the relatively high level of force exerted by the spring element of the spring clip, there will be a minimal tendency for the spring clip to be a source of vibration and shock induced mirror shaking, when the suction cup is utilized as the mounting means.

While we have shown and described various embodiments in accordance with the present invention, it is understand that the same is not limited thereto, but is susceptible to numerous changes and modifications as known to those skilled in the art, and we, therefore, do not wish to limit it to the details shown and described herein, but intend to cover all such changes and modifications as are encompassed by the scope of the appended claims.

We claim:

1. Portable mirror device for rear view observation in a motor vehicle or the like comprising:
    (a) a spring clip having a pair of clip members connected by a spring member, said spring member biasing said clip members toward a position wherein first, holding ends of the clip members engage each other;
    (b) suction cup means fastened to a second end of one of said clip members;
    (c) an adjustment arm swivally connected at one end to a second end of the other of said clip members; and
    (d) mirror means connected to an opposite end of said adjustment arm from the spring clip by a ball-and-socket type joint.

2. Portable mirror device according to claim 1, further comprising releasable locking means for immobilizing said ball-and-socket type joint so as to fix said mirror in a position to which it has been adjusted relative to said adjustment arm, via said ball-and socket type joint, and for freeing said ball-and-socket joint so as to enable adjustment of the position of the mirror relative to said adjustment arm.

3. Portable mirror device according to claim 2, wherein the releasable said releasable locking means comprises a threaded fastening means projecting rearwardly from said mirror means and being threaded into an adjustment knob carried by said adjustment arm.

4. Portable mirror device according to claim 3, wherein the threaded fastening means is a screw shaft projecting from the center of one of a ball and a socket of the ball-and-socket type joint formed by a lense housing of the mirror means and wherein the screw shaft extends through an aperture formed in the other of the ball and the socket, that is formed on said other end of the adjustment arm, into said adjustment knob.

5. Portable mirror device according to claim 4, further comprising a second releasable locking means or immobilizing the swivel connection so as to positionally fix said adjustment arm relative to said clip member and for freeing the swivel connection so as to enable adjustment of the position of the adjustment arm relative to the clip member.

6. Portable mirror according to claim 5, wherein the second releasable locking means comprises a swivel pivot forming fastener, that passes through an aperture formed in each of the adjustment arm and other spring clip member, and a second adjustment knob that receives a threaded end of the pivot forming fastener.

7. Portable mirror device according to claim 2, further comprising a second releasable locking means for immobilizing the swivel connection so as to positionally fix said adjustment arm relative to said clip member and for freeing the swivel connection so as to enable adjustment of the position of the adjustment arm relative to the clip member.

8. Portable mirror according to claim 7, wherein the second releasable locking means comprises a swivel pivot forming fastener, that passes through an aperture formed in each of the adjustment arm and other spring clip member, and a second adjustment knob that receives a threaded end of the pivot forming fastener.

* * * * *